United States Patent
Oba et al.

(10) Patent No.: US 8,049,133 B2
(45) Date of Patent: Nov. 1, 2011

(54) LASER BEAM MACHINING APPARATUS

(75) Inventors: Ryugo Oba, Ota-Ku (JP); Hiroshi Morikazu, Ota-ku (JP)

(73) Assignee: Disco Corporation, Tokyo (JP)

( * ) Notice: Subject to any disclaimer, the term of this patent is extended or adjusted under 35 U.S.C. 154(b) by 820 days.

(21) Appl. No.: 12/110,965

(22) Filed: Apr. 28, 2008

(65) Prior Publication Data

US 2008/0296275 A1 Dec. 4, 2008

(30) Foreign Application Priority Data

May 31, 2007 (JP) .................................. 2007-145784

(51) Int. Cl.
*B23K 26/073* (2006.01)

(52) U.S. Cl. ......... 219/121.65; 219/121.73; 219/121.74; 219/121.75

(58) Field of Classification Search ............ 219/121.61–121.77; 250/492.1–492.23
See application file for complete search history.

(56) References Cited

U.S. PATENT DOCUMENTS

| 4,329,056 A * | 5/1982 | Lacombat et al. ............ 356/460 |
| 4,985,898 A * | 1/1991 | Furuya et al. ................. 372/106 |
| 2005/0279736 A1 * | 12/2005 | Bruland et al. ............ 219/121.8 |

FOREIGN PATENT DOCUMENTS

| JP | A 2004-9139 | 1/2004 |
| JP | A 2007-136477 | 6/2007 |

* cited by examiner

*Primary Examiner* — Samuel M Heinrich
(74) *Attorney, Agent, or Firm* — Greer, Burns & Crain, Ltd.

(57) ABSTRACT

A laser beam machining apparatus including a laser beam irradiation unit, the laser beam irradiation unit including: a laser beam oscillator for oscillating a laser beam; a beam splitter by which the laser beam oscillated by the laser beam oscillator is split into a first laser beam and a second laser beam; a rotary half-wave plate disposed between the laser beam oscillator and the beam splitter; a condenser lens disposed in a first optical path for guiding the first laser beam split by the beam splitter; a first reflecting mirror disposed in a second optical path for guiding the second laser beam split by the beam splitter; a first quarter-wave plate disposed between the beam splitter and the first reflecting mirror; a second reflecting mirror disposed in a third optical path for splitting thereinto the second laser beam returned to the beam splitter through the second optical path; a second quarter-wave plate disposed between the beam splitter and the second reflecting mirror; and a cylindrical lens disposed between the beam splitter and the second quarter-wave plate.

8 Claims, 9 Drawing Sheets

LASER BEAM MACHINING APPARATUS

BACKGROUND OF THE INVENTION

1. Field of the Invention

The present invention relates to a laser beam machining apparatus for laser beam machining of a work such as a semiconductor wafer, and particularly to a laser beam machining apparatus in which the shape of a condensed spot of a laser beam can be controlled.

2. Description of the Related Art

In a semiconductor device manufacturing process, a plurality of regions are demarcated in a surface of a substantially circular disk-shaped semiconductor wafer by planned dividing lines called streets which are arranged in a lattice pattern, and devices such as ICs and LSIs are formed in the demarcated regions. Then, the semiconductor wafer is cut (diced) along the planned dividing lines to divide the regions with the devices formed therein, whereby individual semiconductor chips are manufactured. Similarly, an optical device wafer in which light receiving devices such as photodiodes or light emitting devices such as laser diodes are stacked on a surface of a sapphire substrate is also cut (diced) along streets, thereby dividing the wafer into individual devices such as photodiodes, laser diodes, etc., which are widely utilized for electric apparatuses.

As a method for dividing the wafer such as the above-mentioned semiconductor wafer and optical device wafer along the streets, there has been proposed a method in which irradiation with a pulsed laser beam is conducted along the streets formed in the wafer so as to form laser beam-machined grooves, and the wafer is broken along the laser beam-machined grooves (refer to, for example, Japanese Patent Laid-open No. 2004-9139).

In using the laser beam with which to irradiate the work, the machining conditions can be appropriately controlled, as required, by regulating the output, wavelength, repetition frequency, condensed beam spot shape, etc. of the laser beam. However, it is difficult to appropriately change the condensed beam spot shape into a circle or ellipses varying in the ratio of major axis to minor axis, as required, so that there are limitations to the control of the machining conditions.

In consideration of the above circumstances, the present applicant has proposed, in Japanese Patent Application No. 2005-331118, a laser beam machining apparatus in which a condenser for condensing a laser beam includes a first cylindrical lens and a second cylindrical lens oriented to have a condensing direction orthogonal to that of the first cylindrical lens, and modification of the condensed beam spot shape of the laser beam into a circle or ellipses varying in the ratio of major axis to minor axis can be easily achieved by regulating the interval between the first cylindrical lens and the second cylindrical lens.

In this laser beam machining apparatus, however, since the condenser is so configured to change the condensed beam spot shape through the combination of cylindrical lenses, the shape of the circular beam spot becomes close to a square due to the influence of aberration. Therefore, in the case of boring a via hole in a semiconductor device, for example, it is impossible to form a circular via hole. In addition, in the condenser based on the combination of cylindrical lenses as above-mentioned, the condensed beam spot shape is either a circle or an ellipse. Therefore, machining with an elliptic condensed beam spot and machining with a circular condensed beam spot cannot be carried out at the same time.

SUMMARY OF THE INVENTION

Accordingly, it is an object of the present invention to provide a laser beam machining apparatus with which it is possible to set the condensed beam spot shape of a laser beam into a perfect circle and an ellipse and to form an elliptic condensed beam spot and a circular condensed beam spot at the same time.

In accordance with an aspect of the present invention, there is provided a laser beam machining apparatus including a chuck table for holding a work, laser beam irradiation means for irradiating the work held by the chuck table with a laser beam, and machining feeding means for relative machining feeding of the chuck table and the laser beam irradiation means, wherein the laser beam irradiation means includes: laser beam oscillation means for oscillating a laser beam; a beam splitter by which the laser beam oscillated by the laser beam oscillation means is split into a first laser beam having a first plane of polarization and a second laser beam having a second plane of polarization orthogonal to the first plane of polarization; a rotary half-wave plate disposed between the laser beam oscillation means and the beam splitter; a condenser lens disposed in a first optical path for guiding the first laser beam split by the beam splitter; a first reflecting mirror which is disposed in a second optical path for guiding the second laser beam split by the beam splitter and by which the second laser beam is returned to the beam splitter; a first quarter-wave plate disposed between the beam splitter and the first reflecting mirror; a second reflecting mirror which is disposed in a third optical path for splitting thereinto the second laser beam returned to the beam splitter through the second optical path and by which the second laser beam split into the third optical path is returned to the beam splitter; a second quarter-wave plate disposed between the beam splitter and the second reflecting mirror; and a cylindrical lens disposed between the beam splitter and the second quarter-wave plate, and wherein the second laser beam returned to the beam splitter through the third optical path is guided to the condenser through the first optical path.

According to the laser beam machining apparatus in the present invention, an elliptic condensed beam spot and a circular condensed beam spot can be formed simultaneously, and, therefore, laser beam machining can be carried out in various manners.

The above and other objects, features and advantages of the present invention and the manner of realizing them will become more apparent, and the invention itself will best be understood from a study of the following description and appended claim with reference to the attached drawings showing some preferred embodiments of the invention.

DETAILED DESCRIPTION OF THE PREFERRED EMBODIMENTS

Figure 1:
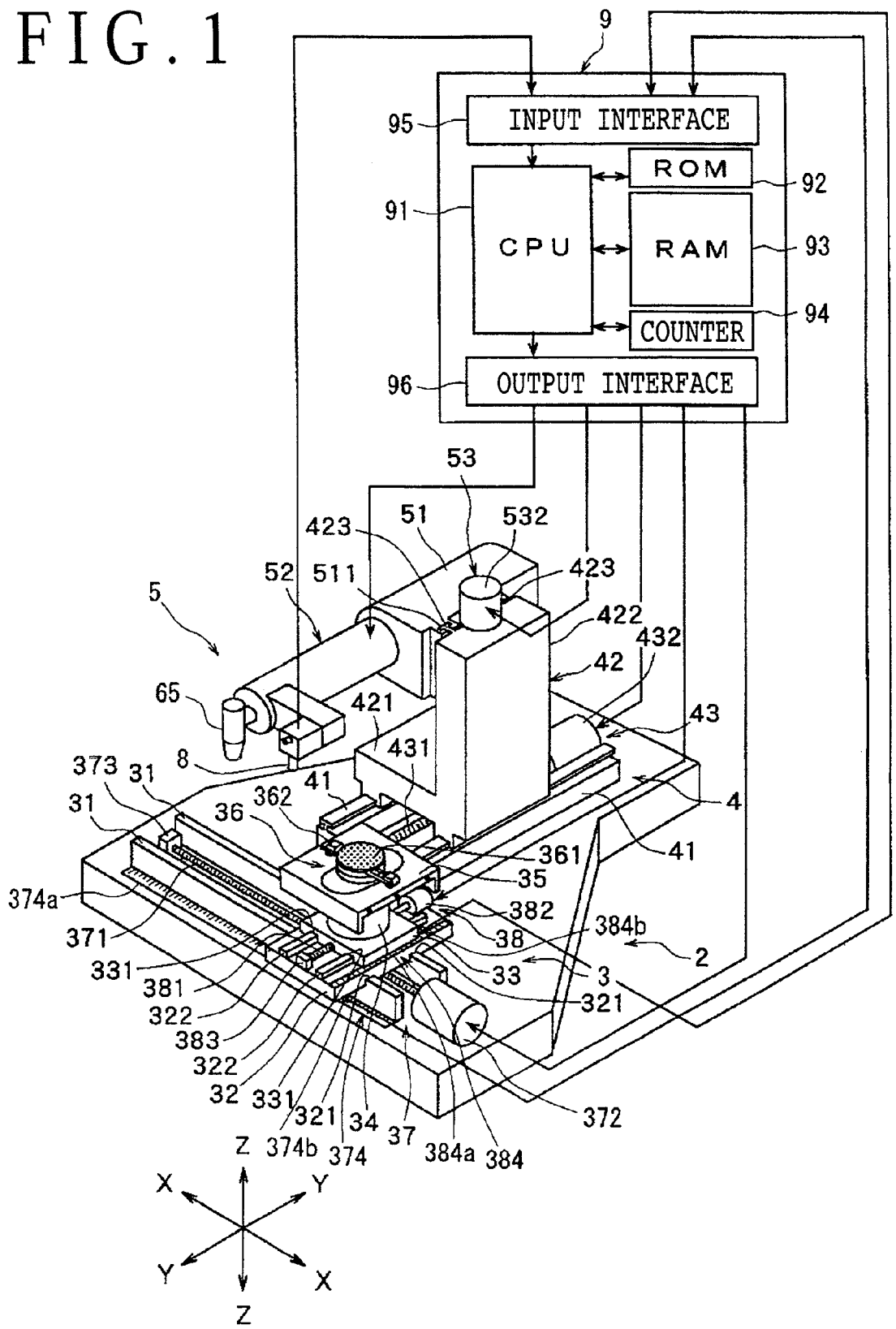
FIG. 1 is a perspective view of a laser beam machining apparatus configured according to the present invention.

Now, preferred embodiments of the laser beam machining apparatus configured according to the present invention will be described more in detail below, referring to the accompanying drawings. FIG. 1 shows a perspective view of the laser beam machining apparatus configured according to the present invention. The laser beam machining apparatus shown in FIG. 1 includes a stationary base 2, a chuck table mechanism 3 which is disposed on the stationary base 2 so as to be movable in a machining feed direction (X-axis direction) indicated by arrow X and by which a work is held, a laser beam irradiation unit support mechanism 4 disposed on the stationary base 2 so as to be movable in an indexing feed direction (Y-axis direction) indicated by arrow Y orthogonal to the direction (X-axis direction) indicated by arrow X, and a laser beam irradiation unit 5 disposed on the laser beam irradiation unit support mechanism 4 so as to be movable in a direction (Z-axis direction) indicated by arrow Z.

The chuck table mechanism 3 includes a pair of guide rails 31, 31 disposed on the stationary base 2 in parallel to each other along the machining feed direction (X-axis direction) indicated by arrow X, a first slide block 32 disposed on the guide rails 31, 31 so as to be movable in the machining feed direction (X-axis direction) indicated by arrow X, a second slide block 33 disposed on the first slide block 32 so as to be movable in the indexing feed direction (Y-axis direction) indicated by arrow Y, a cover table 35 supported on the second slide block 33 by a cylindrical member 34, and a chuck table 36 as work holding means. The chuck table 36 includes a suction chuck 361 formed from a porous material, and the work, for example, a circular disk-shaped semiconductor wafer is held on the suction chuck 361 by suction means (not shown). The chuck table 36 thus configured is rotated by a pulse motor (not shown) disposed inside the cylindrical member 34. Incidentally, the chuck table 36 is equipped with clamps 362 for fixing the annular frame which will be described later.

The first slide block 32 is provided in a lower surface thereof a pair of guided grooves 321, 321 in which to fit the pair of guide rails 31, 31, and is provided on an upper surface thereof with a pair of guide rails 322, 322 formed in parallel to each other along the indexing feed direction (Y-axis direction) indicated by arrow Y. The first slide block 32 thus configured, with the guided grooves 321, 321 in engagement with the pair of guide rails 31, 31, is movable in the machining feed direction (X-axis direction) indicated by arrow X along the pair of guide rails 31, 31. The chuck table mechanism 3 in the embodiment shown in the figure is equipped with machining feeding means 37 for moving the first slide block 32 in the machining feed direction (X-axis direction) indicated by arrow X along the pair of guide rails 31, 31. The machining feeding means 37 includes a male screw rod 371 disposed between and in parallel to the pair of guide rails 31 and 31, and a drive source such as a pulse motor 372 for rotationally driving the male screw rod 371. The male screw rod 371 has its one end rotatably supported on a bearing block 373 fixed to the stationary base 2, and has its other end power-transmittingly connected to an output shaft of the pulse motor 372. Incidentally, the male screw rod 371 is in screw engagement with a female screw through-hole formed in a female screw block (not shown) projectingly provided on a lower surface of a central part of the first slide block 32. Therefore, with the male screw rod 371 driven to rotate normally and reversely by the pulse motor 372, the first slide block 32 is moved in the machining feed direction (X-axis direction) indicated by arrow X along the guide rails 31, 31.

The laser beam machining apparatus in the embodiment shown in the figure has machining feed amount detection means 374 for detecting the machining feed amount of the chuck table 36. The machining feed amount detection means 374 is composed of a linear scale 374a disposed along the guide rail 31, and a reading head 374b disposed on the first slide block 32 and moved along the linear scale 374a together with the first slide block 32. The reading head 374b of the machining feed amount detection means 374, in the embodiment shown in the figure, sends a pulse signal having one pulse per 1-μm feed to control means which will be described later. The control means (described later) counts the pulses in the pulse signal inputted thereto, thereby detecting the machining feed amount of the chuck table 36. Therefore, the machining feed amount detection means 374 functions as X-axis direction position detection means for detecting the position in the X-axis direction of the chuck table 36. Incidentally, in the case where the pulse motor 372 is used as the drive source for the machining feeding means 37, the machining feed amount of the chuck table 36 can be detected also by counting the driving pulses in the control means (described later) which outputs a driving signal to the pulse motor 372. Besides, in the case where a servo motor is used as the drive source for the machining feeding means 37, the machining feed amount of the chuck table 36 can be detected also by sending to the control means (described later) a pulse signal outputted by a rotary encoder for detecting the revolution number of the servo motor, and counting the pulses in the inputted pulse signal by the control means.

The second slide block 33 is provided in a lower surface thereof with a pair of guided grooves 331, 331 for engagement with the pair of guide rails 322, 322 provided on the upper surface of the first slide block 32, and, with the guided grooves 331, 331 engaged with the pair of guide rails 322, 322, the second slide block 33 is movable in the indexing feed direction (Y-axis direction) indicated by arrow Y. The chuck table mechanism 3 in the embodiment shown in the figure is provided with first indexing feeding means 38 for moving the second slide block 33 in the indexing feed direction (Y-axis direction) indicated by arrow Y along the pair of guide rails 322, 322 provided on the first slide block 32. The first indexing feeding means 38 includes a male screw rod 381 disposed between and in parallel to the pair of guide rails 322 and 322, and a drive source such as a pulse motor 382 for rotationally driving the male screw rod 381. The male screw rod 381 has its one end rotatably supported on a bearing block 383 fixed on an upper surface of the first slide block 32, and has its other end power-transmittingly connected to an output shaft of the pulse motor 382. Incidentally, the male screw rod 381 is in screw engagement with a female screw through-hole formed in a female screw block (not shown) projectingly provided on a lower surface of a central part of the second slide block 33. Therefore, with the male screw rod 381 driven to rotate normally and reversely by the pulse motor 382, the second slide block 33 is moved in the indexing feed direction (Y-axis direction) indicated by arrow Y along the guide rails 322, 322.

The laser beam machining apparatus in the embodiment shown in the figure has indexing feed amount detection means 384 for detecting the indexing feed amount of the second slide block 33. The indexing feed amount detection means 384 is composed of a linear scale 384a disposed along the guide rail 322, and a reading head 384b disposed on the second slide block 33 and moved along the linear scale 384a together with the second slide block 33. The reading head 384b of the indexing feed amount detection means 384, in the embodiment shown in the figure, sends a pulse signal having one pulse per 1-μm feed to the control means which will be described later. The control means (described later) counts the pulses in the pulse signal inputted thereto, thereby detecting the indexing feed amount of the chuck table 36. Therefore, the indexing feed amount detection means 384 functions as Y-axis direction position detection means for detecting the position in the Y-axis direction of the chuck table 36. Incidentally, in the case where a pulse motor 382 is used as the drive source for the first indexing feeding means 38, the indexing feed amount of the chuck table 36 can be detected also by counting the driving pulses in the controlling means (described later) for outputting the driving signals to the pulse motor 382. Besides, in the case where a servo motor is used as the drive source for the first indexing feeding means 38, the indexing feed amount of the chuck table 36 can be detected also by sending to the control means (described later) a pulse signal outputted by a rotary encoder for detecting the revolution number of the servo motor, and counting the pulses in the inputted pulse signal by the control means.

The laser beam irradiation unit support mechanism 4 includes a pair of guide rails 41, 41 disposed on the stationary base 2 in parallel to each other along the indexing feed direction (Y-axis direction) indicated by arrow Y, and a movable support base 42 disposed on the guide rails 41, 41 so as to be movable in the direction indicated by arrow Y. The movable support base 42 is composed of a moving support part 421 movably disposed on the guide rails 41, 41, and an attached part 422 attached to the moving support part 421. The attached part 422 is provided on a side surface thereof with a pair of parallel guide rails 423, 423 extending in a direction (Z-axis direction) indicated by arrow Z. The laser beam irradiation unit support mechanism 4 in the embodiment shown in the figure has second indexing feeding means 43 by which the movable support base 42 is moved in the indexing feed direction (Y-axis direction) indicated by arrow Y along the pair of guide rails 41, 41. The second indexing feeding means 43 includes a male screw rod 431 disposed between and in parallel to the pair of guide rails 41, 41, and a drive source such as a pulse motor 432 for rotationally driving the male screw rod 431. The male screw rod 431 has its one end rotatably supported on a bearing block (not shown) fixed on the stationary base 2, and has its other end power-transmittingly connected to an output shaft of the pulse motor 432. Incidentally, the male screw rod 431 is in screw engagement with a female screw hole formed in a female screw block (not shown) projectingly provided on a lower surface of a central part of the moving support part 421 constituting the movable support base 42. Therefore, with the male screw rod 431 driven to rotate normally and reversely by the pulse motor 432, the movable support base 42 is moved in the indexing feed direction (Y-axis direction) indicated by arrow Y along the guide rails 41, 41.

The laser beam irradiation unit 5 in the embodiment shown in the figure includes a unit holder 51, and a cylindrical casing 52 which is mounted to the unit holder 51 and which contains laser beam irradiation means to be described later. The unit holder 51 has a pair of guided grooves 511, 511 for slidable engagement with a pair of guide rails 423, 423 provided on the attached part 422, and, with the guided grooves 511, 511 engaged with the guide rails 423, 423, the unit holder 51 is supported to be movable in the direction (Z-axis direction) indicated by arrow Z.

The laser beam irradiation unit 5 in the embodiment shown in the figure has moving means 53 by which the unit holder 51 is moved in the direction (Z-axis direction) indicated by arrow Z along the pair of guide rails 423, 423. The moving means 53 includes a male screw rod (not shown) disposed between the pair of guide rails 423, 423, and a drive source such as a pulse motor 532 for rotationally driving the male screw rod; with the male screw rod (not shown) driven to rotate normally and reversely by the pulse motor 532, the unit holder 51 and the cylindrical casing 52 containing the laser beam irradiation means (described later) are moved in the direction (Z-axis direction) indicated by arrow Z along the guide rails 423, 423. Incidentally, in the embodiment shown in the figure, the cylindrical casing 52 containing the laser beam irradiation means (described later) is moved upwards by driving the pulse motor 532 to rotate normally, and the cylindrical casing 52 containing the laser beam irradiation means (described later) is moved downwards by driving the pulse motor 532 to rotate reversely.

The laser beam irradiation means contained in the cylindrical casing 52 will be described referring to FIGS. 2 and 3. The laser beam irradiation means 6 shown in FIG. 2 includes pulsed laser beam oscillation means 61 having a YVO4 (Yttrium Orthovanadate) pulsed laser oscillator or a YAG (Yttrium Aluminum Garnet) pulsed laser oscillator for oscillating a pulsed laser beam, an output control unit 62 for controlling the output of the pulsed laser beam LB oscillated from the pulsed laser beam oscillation means 61, and a beam splitter 63 by which the pulsed laser beam LB controlled in output by the output control unit 62 is split into a first laser beam LB1 having a first plane of polarization and a second laser beam LB2 having a second plane of polarization orthogonal to the first plane of polarization. The first laser beam LB1 split by the beam splitter 63 has the first plane of polarization which corresponds, for example, to P wave, whereas the second laser beam LB2 has the second plane of polarization which corresponds, for example, to S wave.

Figure 2:
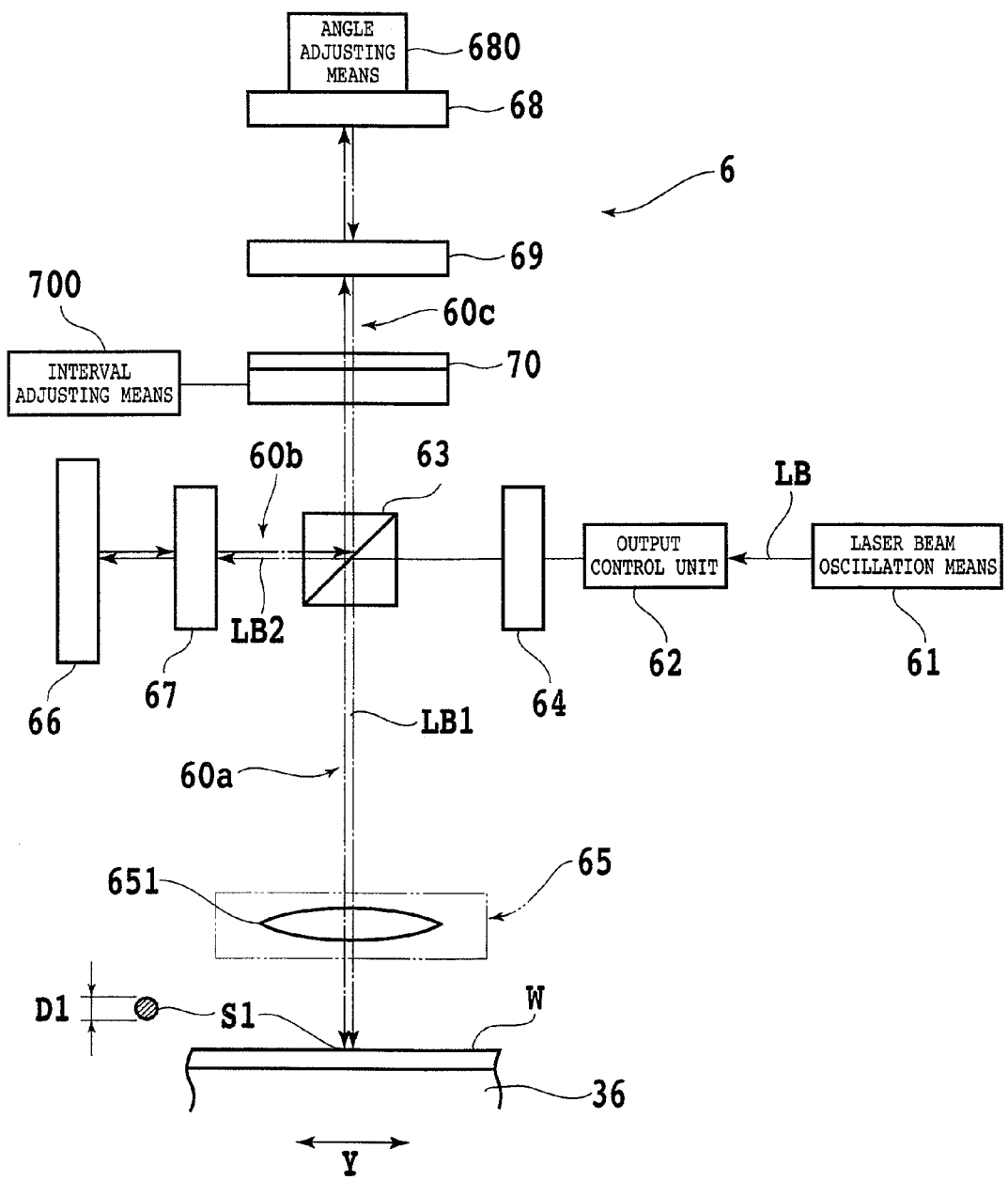
FIG. 2 is a block diagram briefly showing the configuration of laser beam irradiation means with which the laser beam machining apparatus shown in FIG. 1 is equipped.
Figure 3:
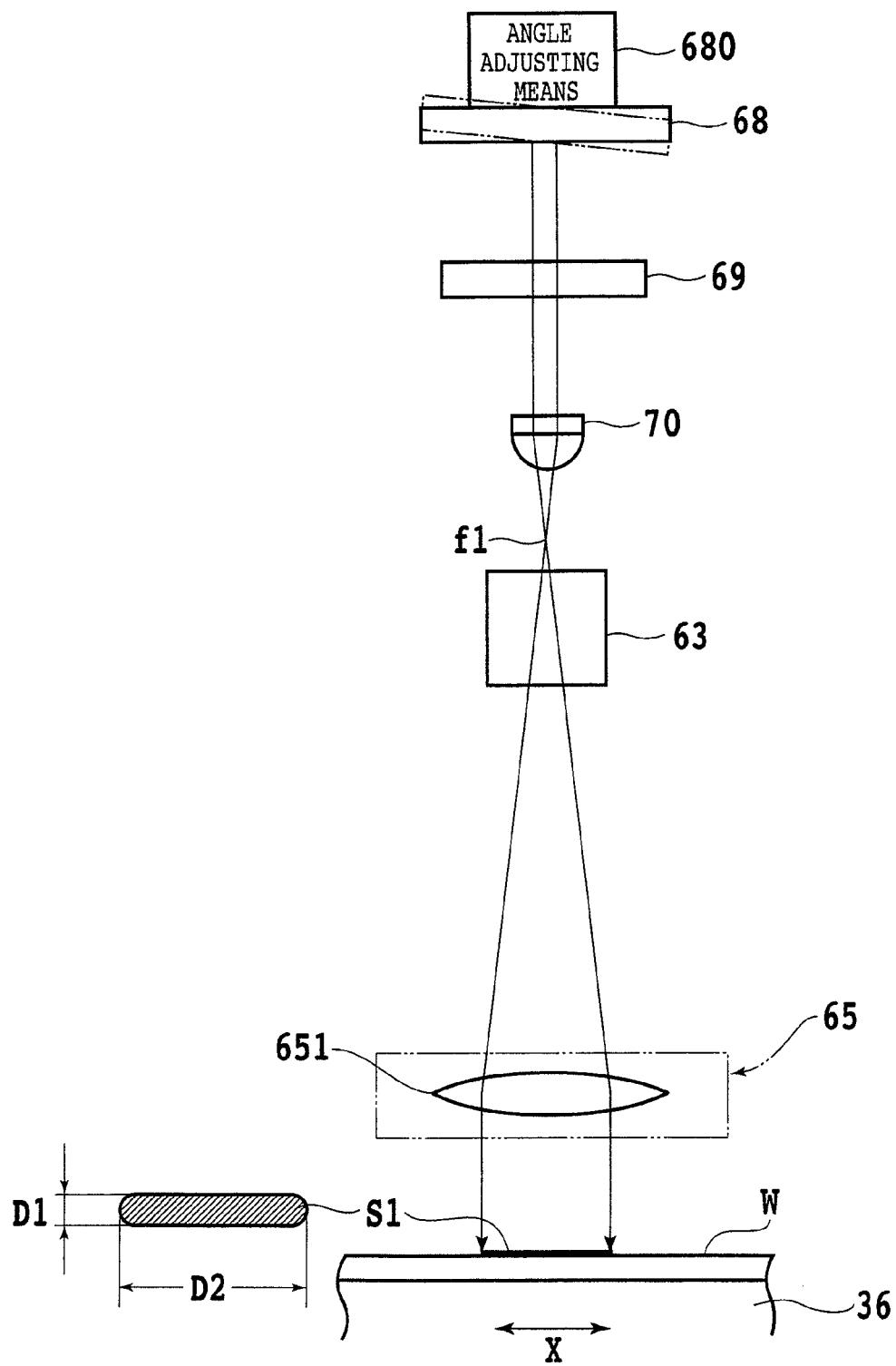
FIG. 3 is a block diagram showing an essential part of the laser beam irradiation means shown in FIG. 2.

The laser beam irradiation means 6 shown in FIG. 2 has a rotary half-wave plate 64 disposed between the output control unit 62, which controls the output of the pulsed laser beam LB oscillated from the pulsed laser beam oscillation means 61, and the beam splitter 63. The rotary half-wave plate 64 controls the direction of the plane of polarization of the pulsed laser beam oscillated from the laser beam irradiation means 6, and guides the pulsed laser beam to the beam splitter 63. More specifically, the rotary half-wave plate 64 controls the direction of the plane of polarization of the pulsed laser beam LB oscillated from the laser beam irradiation means 6 to thereby have a function of guiding the first laser beam LB1 and the second laser beam LB2, split by the beam splitter 63, into a first optical path 60a and a second optical path 60b in respective arbitrary proportions, a function of guiding only the first laser beam LB1 into the first optical path 60a, and a function of guiding only the second laser beam LB2 into the second optical path 60b.

In the first optical path 60a is disposed a condenser 65 having a condenser lens 651. The condenser lens 651 condenses the first laser beam LB1 and the second laser beam LB2 to be described later, to irradiate a work W held on the chuck table 36 with the laser beams. Incidentally, since the pulsed laser beam LB oscillated from the laser beam oscillation means 61 is circular in cross section, the condensed beam spot S1 of the first laser beam LB1 split by the beam splitter 63 and condensed by the condenser lens 651 is a perfect circle having a diameter D1.

In the second optical path 60b is disposed a first reflecting mirror 66 by which the second laser beam LB2 split by the beam splitter 63 is returned to the beam splitter 63. Besides, in the second optical path 60b, a first quarter-wave plate 67 is disposed between the beam splitter 63 and the first reflecting mirror 66. The first quarter-wave plate 67 polarizes the second plane of polarization of the second laser beam LB2 split by the beam splitter 63 into circularly polarized light (spirally polarized light), converts the plane of polarization of the circularly polarized light (spirally polarized light) of the second laser beam LB2 reflected by the first reflecting mirror 66 into the first plane of polarization, and guides the second laser beam LB2 to the beam splitter 63.

The second laser beam LB2 reflected by the first reflecting mirror 66 and returned through the first quarter-wave plate 67 to the beam splitter 63 has undergone conversion from S wave to P wave, and is again guided by the beam splitter 63 into a third optical path 60c. In the third optical path 60c is disposed a second reflecting mirror 68 by which the second laser beam LB2 split by the beam splitter 63 is returned to the beam splitter 63. The second reflecting mirror 68 is so configured that the setting angle thereof can be adjusted by angle adjusting means 680; for example, the setting angle can be changed as indicated by broken lines in FIG. 3. Besides, in the third optical path 60c, a second quarter-wave plate 69 is disposed between the beam splitter 63 and the second reflecting mirror 68, and a cylindrical lens 70 is disposed between the beam splitter 63 and the second quarter-wave plate 69. The second quarter-wave plate 69 converts the P wave of the second laser beam LB2 guided by the beam splitter 63 and transmitted through the cylindrical lens 70 into circularly polarized light (spirally polarized light), and converts the plane of polarization of the circularly polarized light (spirally polarized light) of the second laser beam LB2 reflected by the second reflecting mirror 68 into S wave.

The cylindrical lens 70 is so disposed as to condense the second laser beam LB2, which has been reflected by the second reflecting mirror 68 and transmitted through the second quarter-wave plate 69, into the X-axis direction. Since the second laser beam LB2 condensed by the cylindrical lens 70 has undergone the conversion of the plane of polarization into the second plane of polarization, i.e., the S wave by the second quarter-wave plate 69 as described above, the second laser beam LB2 is guided by the beam splitter 63 into the first optical path 60a. Here, the second laser beam LB2 condensed by the cylindrical lens 70 will be described referring to FIG. 3. While the second laser beam LB2 reflected by the second reflecting mirror 68 and transmitted through the second quarter-wave plate 69 is condensed into the X-axis direction by the cylindrical lens 70, it is widened in the X-axis direction upon passing through the focus f1 of the cylindrical lens 70. The second laser beam LB2 incident on the condenser lens 651 in the state of being thus widened in the X-axis direction is condensed by the condenser lens 651, the condensed beam spot S2 is in the shape of an ellipse having a minor axis D1 and a major axis D2. The major axis D2 of the elliptic condensed beam spot S2 can be changed by adjusting the interval between the cylindrical lens 70 and the condenser lens 651 by interval adjusting means 700 for moving the cylindrical lens 70 in the vertical direction in FIG. 2.

Incidentally, while a half-wave plate can be used as each of the first quarter-wave plate 67 and the second quarter-wave plate 69, such a configuration is undesirable because either of the P wave and the S wave must be discarded and a loss in output is therefore generated.

The laser beam irradiation means 6 shown in FIG. 2 is configured as above-mentioned, and it operates as follows.

<First Mode>

In a first mode, the angle of the rotary half-wave plate 64 is adjusted so that only the first laser beam LB1 obtained by splitting the pulsed laser beam LB oscillated from the pulsed laser beam oscillation means 61 by the beam splitter 63 is guided into the first optical path 60a. As a result, only the first laser beam LB1 split by the beam splitter 63 is condensed by the condenser lens 651, and the work W held on the chuck table 36 is irradiated with the laser beam in a perfect circular condensed beam spot S1.

<Second Mode>

In a second mode, the angle of the rotary half-wave plate 64 is adjusted so that only the second laser beam LB2 obtained by splitting the pulsed laser beam LB oscillated from the pulsed laser beam oscillation means 61 by the beam splitter 63 is guided into the second optical path 60b. As a result, only the second laser beam LB2 split by the beam splitter 63 is guided through the first quarter-wave plate 67, the first reflecting mirror 66, the first quarter-wave plate 67, the beam splitter 63, the cylindrical lens 70, the second quarter-wave plate 69, the second reflecting mirror 68, the second quarter-wave plate 69, and the beam splitter 63 to be condensed by the condenser lens 651, as above-mentioned, and the work W held on the chuck table 36 is irradiated with the laser beam in an elliptic condensed beam spot S2, as above-mentioned.

<Third Mode>

Figure 4A:
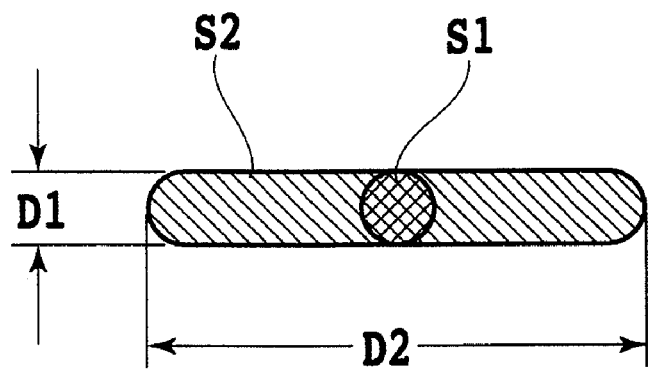
FIGS. 4A and 4B are illustrations of the relationship between a perfect circular condensed beam spot S1 of a first laser beam LB1 and an elliptic condensed beam spot S2 of a second laser beam LB2 which are radiated by the laser beam irradiation means shown in FIG. 2.
Figure 4B:
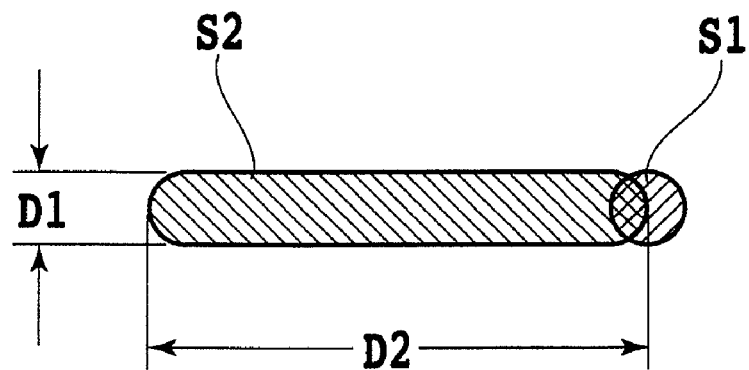

In a third mode, the angle of the rotary half-wave plate 64 is adjusted so that the first laser beam LB1 and the second laser beam LB2 split by the beam splitter 63 are guided into the first optical path 60a and the second optical path 60b in respective arbitrary proportions. Consequently, the work W held on the chuck table 36 is irradiated with the first laser beam LB1 in a perfect circular condensed beam spot S1 as above-mentioned, and the work W held on the chuck table 36 is irradiated with the second laser beam LB2 in an elliptic condensed beam spot S2 as above-mentioned. In the case where the second reflecting mirror 68 is in the state indicated by solid lines, the perfect circular condensed beam spot S1 and the elliptic condensed beam spot S2 are so located that the perfect circular condensed beam spot S1 is located in the center of the major axis D2 of the elliptic condensed beam spot S2, as shown in FIG. 4A. Incidentally, when the second reflecting mirror 68 is inclined as indicated by broken lines in FIG. 3, the elliptic condensed beam spot S2 is displaced in the X-axis direction, whereby the perfect circular condensed beam spot S1 can be located at an end part of the elliptic condensed beam spot S2, as shown in FIG. 4B.

Returning to FIG. 1, at a tip part of the casing 52 for containing the laser beam irradiation means 6, there is disposed image pick-up means 8 for detecting the work region to be laser beam machined by the laser beam irradiation means 6. The image pick-up means 8 includes, in addition to an ordinary image pick-up device (CCD) for image pick-up through the use of visible rays, IR (infrared rays) illumination means for illuminating the work with IR rays, an optical system for catching the IR rays radiated by the IR illumination means, image pick-up means (IR CCD) for outputting an electrical signal corresponding to the IR rays caught by the optical system, and the like, and sends a image signal corresponding to the image thus picked up to the control means which will be described later.

The laser beam machining apparatus in the embodiment shown in the figures has the control means 9. The control means 9 is composed of a computer, including a central processor unit (CPU) 91 for executing arithmetic operations according to a control program, a read only memory (ROM) 92 for storing the control program and the like, a readable and writable random access memory (RAM) 93 for storing the results of arithmetic operations and the like, a counter 94, an input interface 95 and an output interface 96. Detection signals from the machining feed amount detection means 374 and the image pick-up means 8 and the like are inputted to the input interface 95 of the control means 9. Control signals are outputted from the output interface 96 of the control means 9 to the pulse motor 372, the pulse motor 382, the pulse motor 432, the pulse motor 532, the rotary half-wave plate 64 of the laser beam irradiation means 6, and the like.

Figure 5:
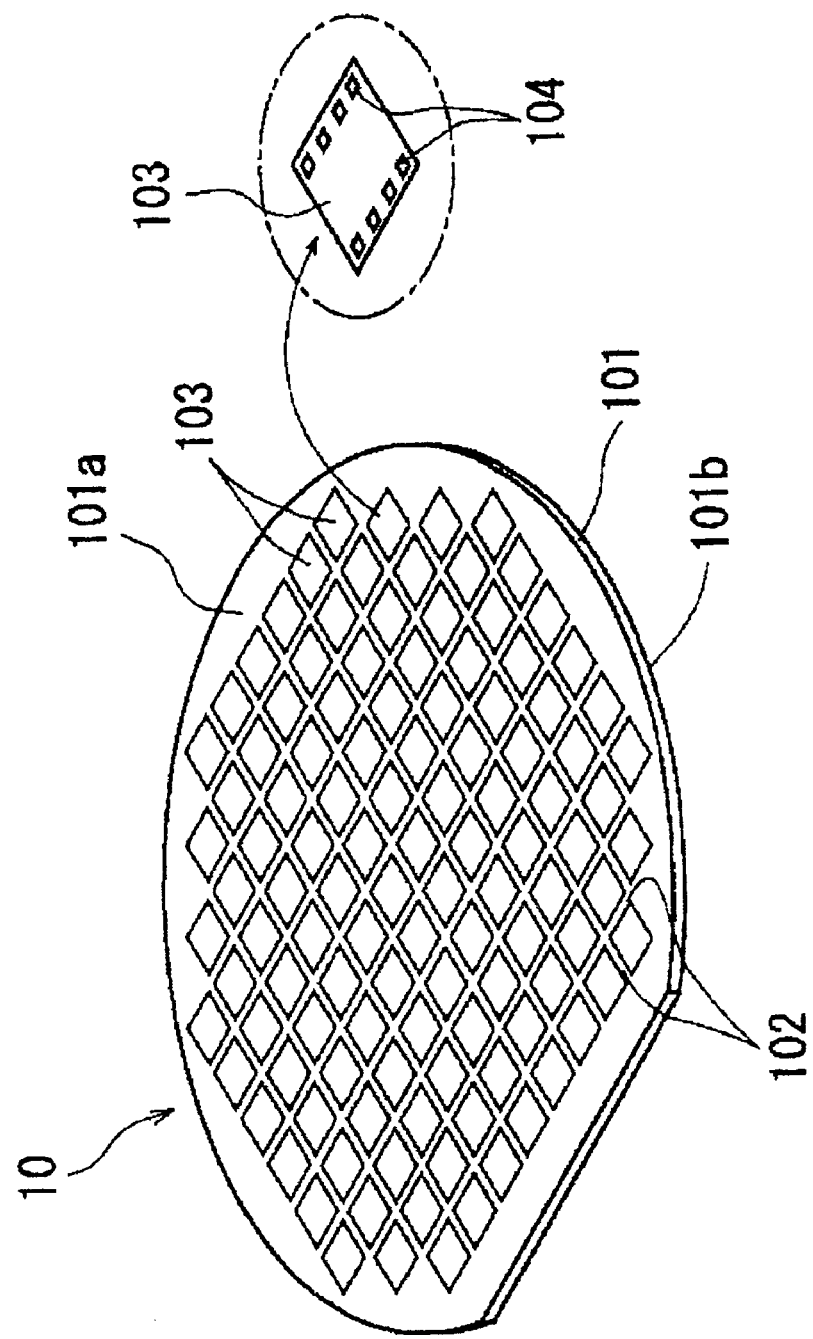
FIG. 5 is a perspective view of a semiconductor wafer as a work.

The laser beam machining apparatus in the embodiment shown in the figures is configured as above, and operates as follows. FIG. 5 shows a perspective view of a semiconductor wafer 10 as a work to be laser beam machined by the laser beam machining apparatus described above. The semiconductor wafer 10 shown in FIG. 5 has a configuration in which a plurality of regions are demarcated by a plurality of streets 102 formed in a lattice pattern in a face side 101a of a substrate 101 formed of silicon and having a thickness of, for example, 100 µm, and devices 103 such as ICs (Integrated Circuit) and LSIs (Large Scale Integration) are formed respectively in the demarcated regions. All the devices 103 are the same in configuration. Each of the devices 103 is provided on its surface with a plurality of bonding pads 104.

Now, an example of laser beam machining applied to the semiconductor wafer 10 shown in FIG. 5 by the above-described laser beam machining apparatus will be described below. First of all, a method of providing the silicon substrate 101 of the semiconductor wafer 10 with via holes reaching the bonding pads 104 will be described.

In order to form the via hole, the control means 9 adjusts the angle of the rotary half-wave plate 64 so that only the first laser beam LB1 obtained by splitting the pulsed laser beam LB oscillated from the pulsed laser beam oscillation means 61 by the beam splitter 63 is guided into the first optical path 60a, as has been described in the first mode above. Then, the semiconductor wafer 10 is suction held on the chuck table 36 of the laser beam machining apparatus, with the face side 101a of the semiconductor wafer 10 in contact with the chuck table 36. Therefore, the semiconductor wafer 10 is held with its back side 101b on the upper side.

The chuck table 36 with the semiconductor wafer 10 suction held thereon as above is positioned just under the image pick-up means 8 by the machining feeding means 37. When the chuck table 36 is positioned just under the image pick-up means 8, the semiconductor wafer 10 on the chuck table 36 is in the state of being positioned at a predetermined coordinate position. In this condition, an alignment operation is carried out to see that the streets 22 formed in the lattice pattern in the semiconductor wafer 10 held on the chuck table 36 are disposed in parallel to the X direction and the Y direction, respectively. Specifically, the image of the semiconductor wafer 10 held on the chuck table 36 is picked up by the image pick-up means 8, and image processing such as pattern matching is carried out, to perform the alignment operation. In this instance, the face side 101a of the substrate 101, in which the streets 102 are formed, of the semiconductor wafer 10 is set on the lower side; however, since the image pick-up means 8 is provided with the IR illumination means, the optical system for catching IR rays, the image pick-up device (IR CCD) for outputting an electrical signal corresponding to the IR rays, and the like, the image of the streets 102 can be picked up in a transmission manner on the side of the back side 101b of the substrate 101.

With the above-mentioned alignment operation carried out, the semiconductor wafer 10 held on the chuck table 36 is positioned at a predetermined coordinate position. Incidentally, of the plurality of bonding pads 104 formed on the device 103 formed on the face side 101a of the silicon substrate 101 of the semiconductor wafer 10, the coordinate positions on a design basis are preliminarily stored in the random access memory (RAM) 93 constituting the control means 9 of the laser beam machining apparatus.

Figure 6:
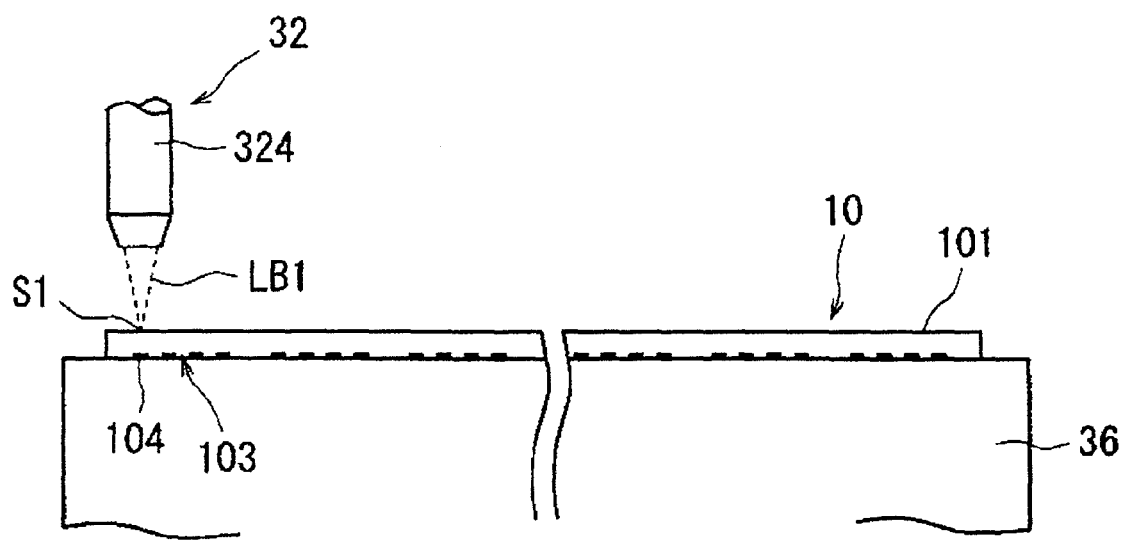
FIG. 6 is an illustration of a via hole forming step for forming a via hole in the semiconductor wafer shown in FIG. 5 by use of the laser beam machining apparatus shown in FIG. 1.

After the above-mentioned alignment operation is carried out, the chuck table 36 is moved as shown in FIG. 6 so that the device 103 at the leftmost end, in FIG. 6, of the plurality of devices 103 arrayed in a predetermined direction on the substrate 101 of the semiconductor wafer 10 is positioned just under the condenser 65. Then, the bonding pad 104 at the leftmost end of the plurality of bonding pads 104 formed on the device 103 at the leftmost end in FIG. 6 is positioned just under the condenser 65.

Figure 7:
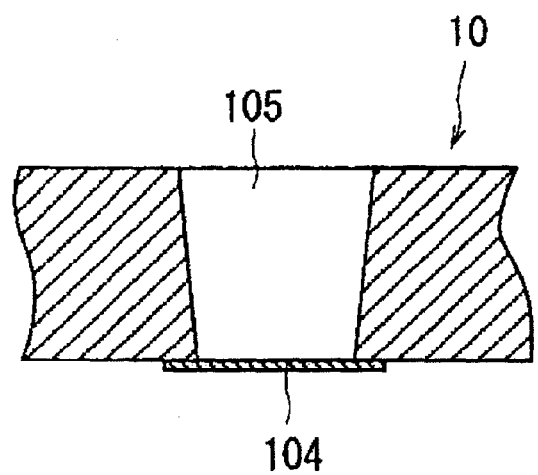
FIG. 7 is an enlarged sectional view of an essential part of the semiconductor wafer formed with the via hole by carrying out the via hole forming step shown in FIG. 6.

Next, a via hole forming step is carried out in which the control means 9 operates the laser beam irradiation means 6 to cause the first laser beam LB1 coming from the condenser 65 to be incident the substrate 101 of the semiconductor wafer 10 from the side of the back side 101b of the substrate 101, whereby a via hole extending from the back side 101b of the substrate 101 to reach the bonding pad 104 is formed in the substrate 101. In this instance, the perfect circular condensed beam spot S1 of the first laser beam LB1 cast through the condenser 65 is adjusted to a position near the back side 101b (upper surface) of the substrate 101. Incidentally, it is desirable that the pulse laser beam used for irradiation therewith is a pulsed laser beam having a wavelength (355 nm) promising absorption into the silicon substrate 101, and the energy density per pulse of the pulsed laser beam is set to a value of 20 to 35 J/cm$^2$ at which ablation of the silicon substrate 101 occurs but ablation of the metal-made bonding pad 104 does not occur. For example, when the silicon substrate 101 is irradiated from the side of its back side 101b with a pulsed laser beam having an energy density per pulse of 35 J/cm$^2$, a hole with a depth of 2 µm can be formed by one pulse of the pulsed laser beam. Therefore, in the case where the thickness of the silicon substrate 101 is 100 µm, it is possible by irradiation with 50 pulses of the pulsed laser beam to form a via hole 105 extending from the back side 101b of the silicon substrate 101 to reach the face side 101a, i.e., to reach the bonding pad 104, as shown in FIG. 7. The via hole 105 thus formed in the silicon substrate 101 is perfect circular in cross-sectional shape, since the condensed beam spot of the first laser beam LB1 with which the substrate 101 is irradiated is a perfect circular condensed beam spot S1.

Figure 8:
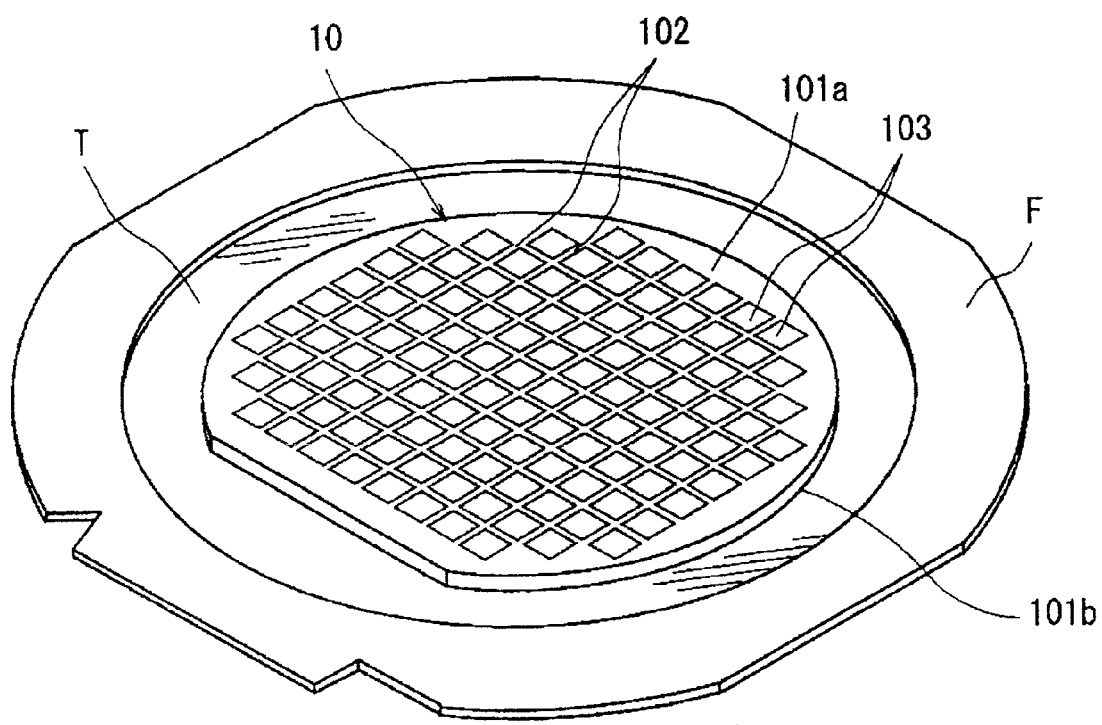
FIG. 8 is a perspective view showing the condition where the semiconductor wafer shown in FIG. 5 is adhered to a protective tape attached to an annular frame.

Now, description will be made of a method of forming a laser beam machined groove along the street 102 in the substrate 101 of the semiconductor wafer 10. In order to form the laser beam machined groove, the control means 9 adjusts the angle of the rotary half-wave plate 64 so that only the second laser beam LB2 obtained by splitting the pulsed laser beam LB oscillated from the pulsed laser beam oscillation means 61 by the beam splitter 63 is guided into the second optical path 60b, as has been described in the second mode above. On the other hand, the back side 101b of the semiconductor wafer 10 is adhered to a protective tape T made from a synthetic resin sheet such as polyolefin and attached to an annular frame F, as shown in FIG. 8. Thus, the semiconductor wafer 10 has its face side 101a on the upper side.

The semiconductor wafer 10 supported on the annular frame F through the protective tape T as shown in FIG. 8 is mounted, with the protective tape T side down, on the chuck table 36 of the laser beam machining apparatus shown in FIG. 1. Then, the suction means (not shown) is operated, whereby the semiconductor wafer 10 is suction held onto the chuck table 36 through the protective tape T. In addition, the annular frame F is fixed by the clamps 362.

The chuck table 36 with the semiconductor wafer 10 suction held thereon as above-mentioned is positioned just under the image pick-up means 8 by the machining feeding means 37. After the chuck table 36 is positioned just under the image pick-up means 8, an alignment operation for detecting the work region to be laser beam machined of the semiconductor wafer 10 is carried out by use of the image pick-up means 8 and the control means 9 as above-mentioned.

Figure 9A:
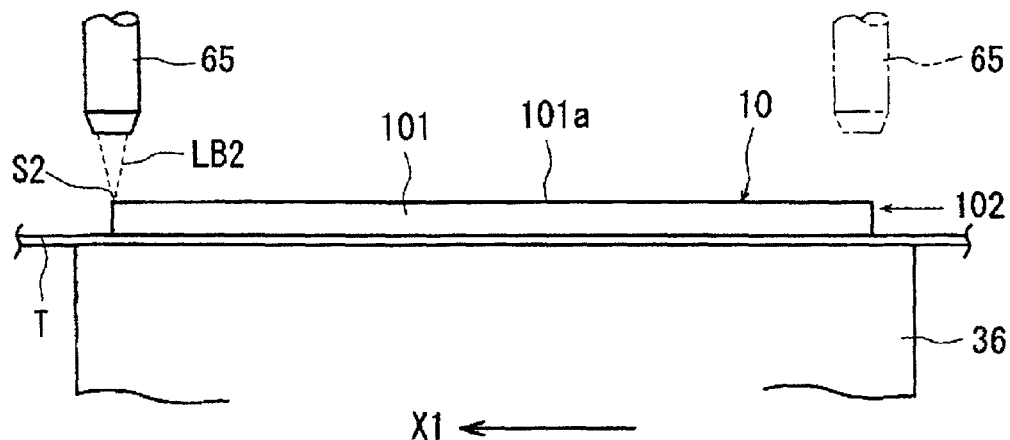
FIGS. 9A to 9C are illustrations of a groove forming step for forming a laser beam-machined groove in the semiconductor wafer shown in FIG. 5 by use of the laser beam machining apparatus shown in FIG. 1.

After the streets 102 formed in the semiconductor wafer 10 held on the chuck table 36 are detected and the alignment of the laser beam irradiation position is conducted in the above-mentioned manner, the chuck table 36 is moved into a laser beam irradiation region where the condenser 65 of the laser beam irradiation means 6 is located as shown in FIG. 9A, and one end (the left end in FIG. 9A) of a predetermined street 102 is positioned just under the condenser 65. Incidentally, the elliptic condensed beam spot S2 of the laser beam cast through the condenser 65 is so positioned that its major axis D2 shown in FIG. 3 is set along the street 102.

Figure 10:
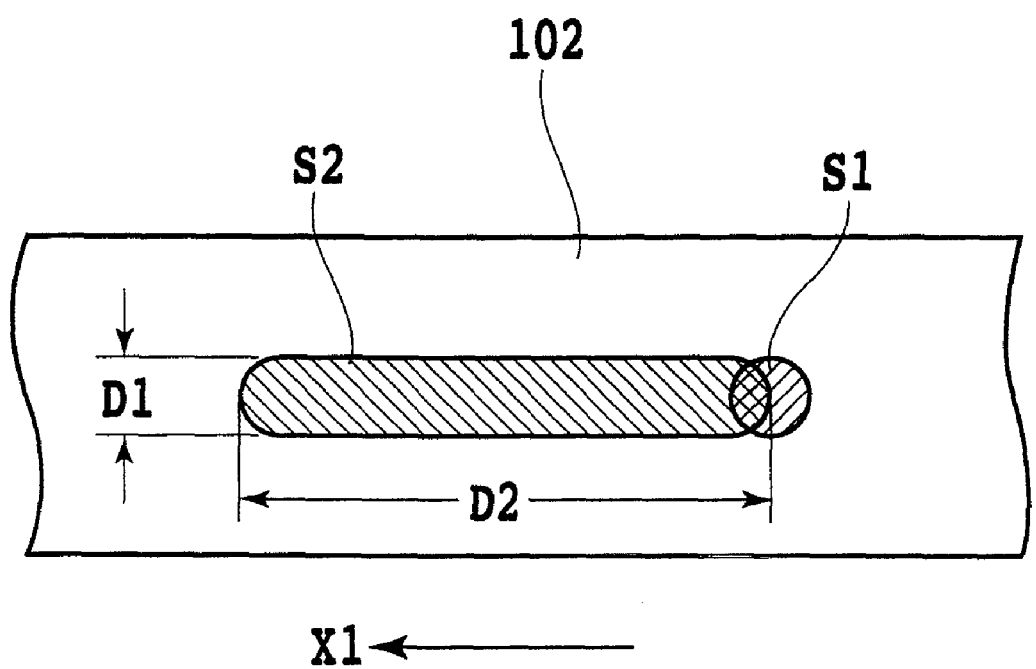
FIG. 10 is an illustration showing another embodiment of the groove forming step for forming a laser beam-machined groove in the semiconductor wafer shown in FIG. 5 by use of the laser beam machining apparatus shown in FIG. 1.

Next, a groove forming step is carried out in which the control means 9 operates the laser beam irradiation means 6 to irradiate the semiconductor wafer 10 with the second laser beam LB2 cast through the condenser 65 along the street 102 in the semiconductor wafer 10, thereby forming a laser beam-machined groove along the street 102. Specifically, while irradiating with the second laser beam LB2 having a wavelength (355 nm) promising absorption into the silicon substrate 101 from the condenser 65 of the laser beam irradiation means 6, the chuck table 36 is moved at a predetermined machining feed rate in the direction indicated by arrow X1 in FIG. 9A. Then, when the other end (the right end in FIG. 9A) of the street 102 has reached the position just under the condenser 65, the irradiation with the pulsed laser beam is stopped and the movement of the chuck table 36 is stopped. In this case, the condensed beam spot S2 of the second laser beam LB2 cast through the condenser 7 is adjusted to a position near the face side 101a (upper surface) of the semiconductor wafer 10. As a result, a laser beam machined groove 106 is formed in the semiconductor wafer 10 along the street 102. In this groove forming step, the major axis D2 of the elliptic condensed beam spot S2 is set along the machining feed direction (X-axis direction). Therefore, the superposition factor of the elliptic condensed beam spots S2 of the pulsed laser beam for irradiation therewith is increased as shown in FIG. 10, it is possible to efficiently perform uniform machining along the street 102.

Now, description will be made of a method of forming a laser beam-machined groove along the street 102 in the case where the surface of the substrate 101 of the semiconductor wafer 10 is coated with an insulating film of silicon oxide ($SiO_2$) or the like. The semiconductor wafer 10 in which the surface of the substrate 101 is coated with an insulating film of silicon oxide ($SiO_2$) or the like has the problem that the insulating film would be exfoliated upon irradiation with the laser beam, to damage the devices 103, resulting in a lowered quality. In order to solve such a problem, in this machining method, the control means 9 adjusts the angle of the rotary half-wave plate 64 so that the first laser beam LB1 and the second laser beam LB2 obtained through the splitting of the laser beam by the beam splitter 63 are guided respectively into the first optical path 60a and the second optical path 60b, as has been described in the third mode above. The control means 9 controls the rotary half-wave plate 64 so that the energy proportion of the first laser beam LB1 will be 30% and the proportion of the second laser beam LB2 will be 70%, and inclines the second reflecting mirror 68 as indicated by broken lines in FIG. 3 so that the perfect circular condensed beam spot S is positioned at an end part of the elliptic condensed beam spot S2 as shown in FIG. 4B.

Figure 9B:
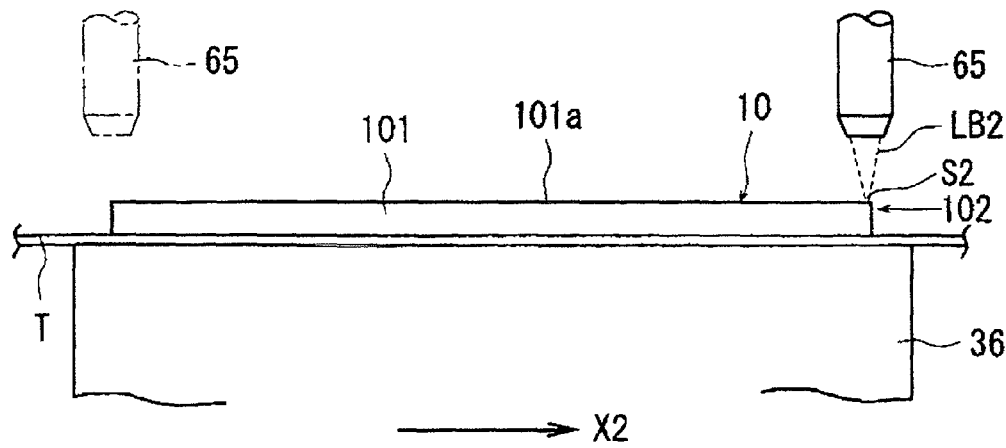
Figure 9C:
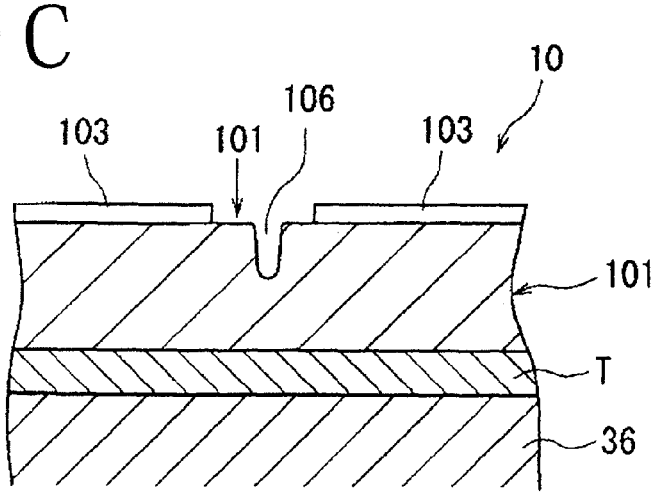

Then, the above-mentioned groove forming step as shown in FIGS. 9A to 9C is carried out. In this groove forming step, the perfect circular condensed beam spot S1 of the first laser beam LB1 and the elliptic condensed beam spot S2 of the second laser beam LB2 are positioned in the relationship shown in FIG. 10. Specifically, the elliptic condensed beam spot S2 is so cast that a part thereof on the upstream side (the right side in FIG. 10) with respect to the moving direction of the chuck table 36 indicated by arrow X1, namely, on the side where the machining is about to be made is superposed on the perfect circular condensed beam spot S1. Therefore, the surface of the street 102 is heated by the energy of the first laser beam LB1 which is cast in the perfect circular condensed beam spot S1. Since the energy of the first laser beam LB1 is 30% based on the energy of the pulsed laser beam LB oscillated from the pulsed laser beam oscillation means 61 as above-mentioned, the insulating film of silicon oxide ($SiO_2$) or the like coating the surface of the substrate 101 of the semiconductor wafer 10 is softened, without being machined. In the condition where the insulating film coating the surface of the substrate 101 of the semiconductor wafer 10 is thus softened, the second laser beam LB2 is cast in the elliptic condensed beam spot S2. Since the energy of the second laser beam LB2 is 70% based on the energy of the pulsed laser beam LB oscillated from the pulsed laser beam oscillation means 61 as above-mentioned, a laser beam-machined groove is formed in the semiconductor wafer 10 along the street 102. In this case, the insulating film coating the surface of the substrate 101 of the semiconductor wafer 10 has been softened by irradiation with the first laser beam LB1 as above-mentioned, and, therefore, the insulating film would not be exfoliated upon irradiation with the second laser beam LB2.

While an example of machining by the laser beam machining apparatus configured according to the present invention has been described above, the laser beam machining apparatus according to the invention can form the condensed beam spot of the laser beam into a perfect circular shape and an elliptic shape as above-mentioned, and can form the elliptic condensed beam spot and the circular condensed beam spot at the same time. Therefore, in addition to the above-described example of machining, various laser beam machining processes can be carried out by use of the laser beam machining apparatus.

The present invention is not limited to the details of the above described preferred embodiments. The scope of the invention is defined by the appended claim and all changes and modifications as fall within the equivalence of the scope of the claim are therefore to be embraced by the invention.

What is claimed is:

1. A laser beam machining apparatus comprising:
   a chuck table for holding a work;
   laser beam irradiation means for irradiating said work held by said chuck table with a laser beam; and
   machining feeding means for relative machining feeding of said chuck table and said laser beam irradiation means, wherein said laser beam irradiation means includes laser beam oscillation means for oscillating a laser beam, a beam splitter by which said laser beam oscillated by said laser beam oscillation means is split into a first laser beam having a first plane of polarization and a second laser beam having a second plane of polarization orthogonal to said first plane of polarization, a rotary half-wave plate disposed between said laser beam oscillation means and said beam splitter, a condenser lens disposed in a first optical path for guiding said first laser beam split by said beam splitter, first reflecting mirror which is disposed in a second optical path for guiding said second laser beam split by said beam splitter and by which said second laser beam is returned to said beam splitter, first quarter-wave plate disposed between said beam splitter and said first reflecting mirror, a second reflecting mirror which is disposed in a third optical path for splitting thereinto said second laser beam returned to said beam splitter through said second optical path and by which said second laser beam split into said third optical path is returned to said beam splitter, a second quarter-wave plate disposed between said beam splitter and said second reflecting mirror, and a cylindrical lens disposed between said beam splitter and said second quarter-wave plate, and wherein said second laser beam returned to said beam splitter through said third optical path is guided to said condenser lens through said first optical path.

2. The laser beam machining apparatus according to claim 1, wherein said beam splitter and said rotary half wave plate are configured and arranged to allow the laser beam machining apparatus to operate in one of the following three modes:
   a first mode in which only said first laser beam is irradiated upon said work;
   a second mode in which only said second laser beam is irradiated upon said work; and
   a third mode in which both said first laser beam and said second laser beam are irradiated upon said work.

3. The laser beam machining apparatus according to claim 2, wherein:
   in said first mode, the work is irradiated by said first laser beam with a first beam spot that is circular in shape;
   in said second mode, the work is irradiated by said second laser beam with a second beam spot that is elliptical in shape; and
   in said third mode, the work is irradiated by a third beam spot that is a combination of said circular first beam spot and said elliptical second beam spot.

4. The laser beam machining apparatus according to claim 3, wherein when operating in said third mode, said circular first beam spot is located approximately in the center of the major axis of said elliptical second beam spot.

5. The laser beam machining apparatus according to claim 3, wherein when operating in said third mode, said circular first beam spot is located near an end part of said elliptical second beam spot.

6. The laser beam machining apparatus according to claim 1, wherein:
   if said first laser beam passes through said condenser lens, said first laser beam irradiates said work with a first beam spot that is circular in shape; and
   if said second laser beam passes through said condenser lens, said second laser beam irradiates said work with a second beam spot that is elliptical in shape.

7. The laser beam machining apparatus according to claim 6, wherein when both said first laser beam and said second laser beam pass through said condenser lens, said circular first beam spot is located approximately in the center of the major axis of said elliptical second beam spot.

8. The laser beam machining apparatus according to claim 6, wherein when both said first laser beam and said second laser beam pass through said condenser lens, said circular first beam spot is located near an end part of said elliptical second beam spot.

* * * * *